United States Patent [19]

Atkinson et al.

[11] Patent Number: 5,793,448
[45] Date of Patent: Aug. 11, 1998

[54] CATHODE RAY TUBE PACKAGES

[75] Inventors: George David Atkinson, Manchester; James Francis Nangle, Rochdale, both of England

[73] Assignee: Brimar Limited, England

[21] Appl. No.: 507,485
[22] PCT Filed: Jan. 31, 1994
[86] PCT No.: PCT/GB94/00186
  § 371 Date: Sep. 26, 1995
  § 102(e) Date: Sep. 26, 1995
[87] PCT Pub. No.: WO94/19904
  PCT Pub. Date: Sep. 1, 1994

[30] Foreign Application Priority Data

Feb. 23, 1993 [GB] United Kingdom ............... 9303644

[51] Int. Cl.[6] ............... H04N 5/64; H04N 5/645; H01J 29/50; H01J 23/34
[52] U.S. Cl. ............... 348/838; 348/805; 348/806; 348/826; 348/830; 348/776; 348/744; 348/284; 348/325; 348/380; 358/507; 358/485; 313/409; 313/411; 313/364; 313/402; 313/441; 315/1; 315/3
[58] Field of Search ............... 348/805, 806, 348/826, 830, 838, 776, 744, 284, 325, 380; 358/507, 485; 313/409, 411, 414, 364, 402, 441; 315/3, 1

[56] References Cited

U.S. PATENT DOCUMENTS 2,456,399  12/1948  Gethmann .
3,404,227  10/1968  Alcala et al. .
3,887,766   6/1975  Caswell ........................ 348/820
4,757,239   7/1988  Starkey, IV ..................... 315/371

FOREIGN PATENT DOCUMENTS 1150441  4/1969  United Kingdom ........... H04N 5/645

OTHER PUBLICATIONS

Ferranti Electronic Display High Resolution Cathode Ray Tube Mounting Unit, Type M400, Issue 2, May 1966.
Ferranti—Microspot Cathode Ray Tubes—Mounting Systems (Apr. 1967).
Ferranti—Microspot Cathode Ray Tubes—Integral Mounting and Collars (Oct. 1974).
Ferranti—Microspot Cathode Ray Tubes—Operating Notes (Jul. 1977).
Ferranti Special Components Department short form catalog (approx. 1970–79).
Ferranti—Microspot Cathode Ray Tubes and Display Equipment short form catalog (1978).

*Primary Examiner*—Edward L. Coles, Sr.
*Assistant Examiner*—Tia M. Harris
*Attorney, Agent, or Firm*—Lerner, David, Littenberg, Krumholz & Mentlik

[57] ABSTRACT

A cathode ray tube package includes a cathode ray tube assembly and a housing assembly including a deflection coil and/or at least one focus coil. The cathode ray tube assembly includes a collar (31) aligned with the electron beam, being arranged to mate with a mounting collar (41) carried on the housing assembly. The provision of the collar (31) enables the cathode ray tube assembly to be easily replaced at the end of the cathode ray tube's life within the housing assembly without the need for realignment of the coils.

17 Claims, 4 Drawing Sheets

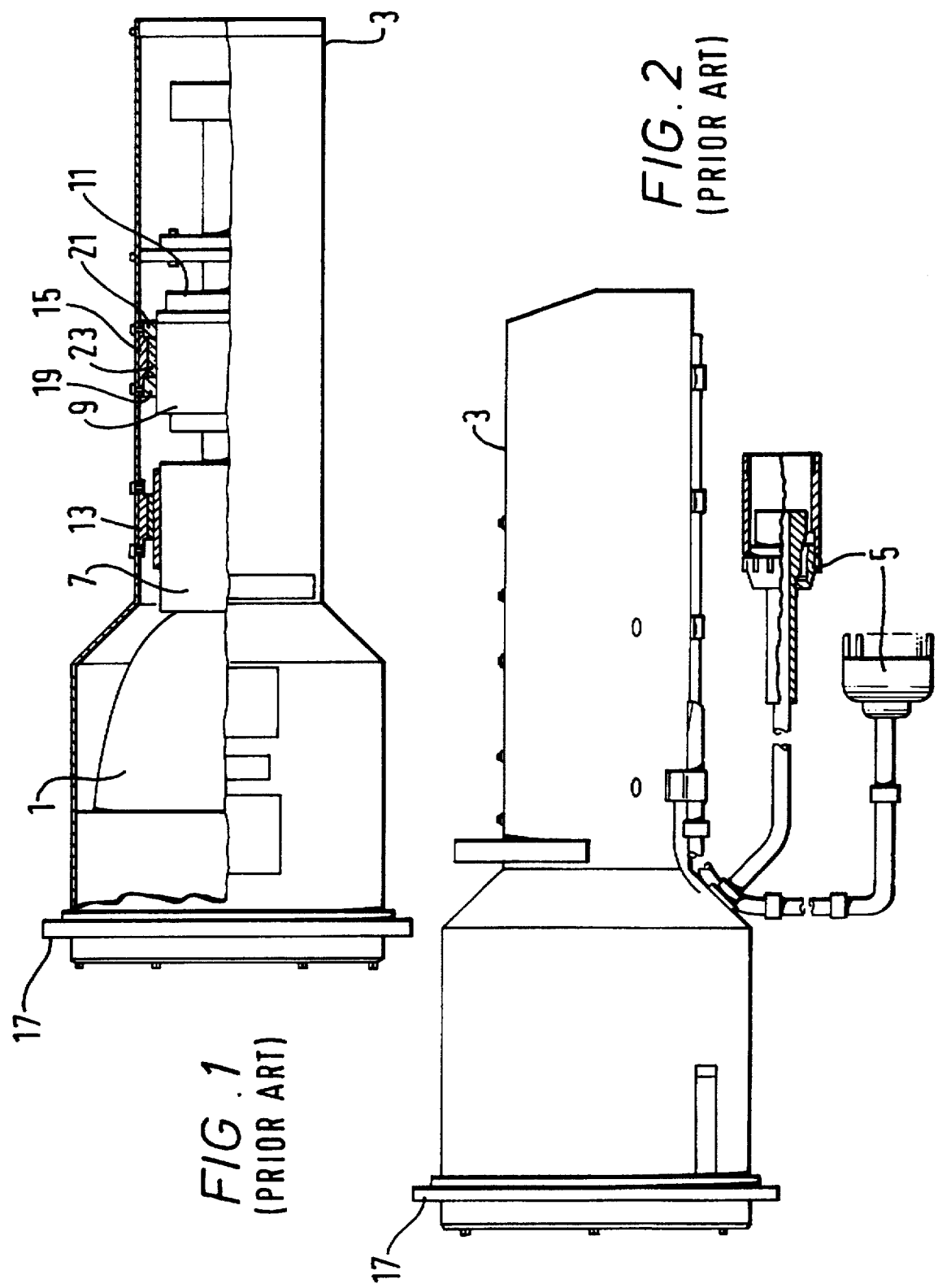

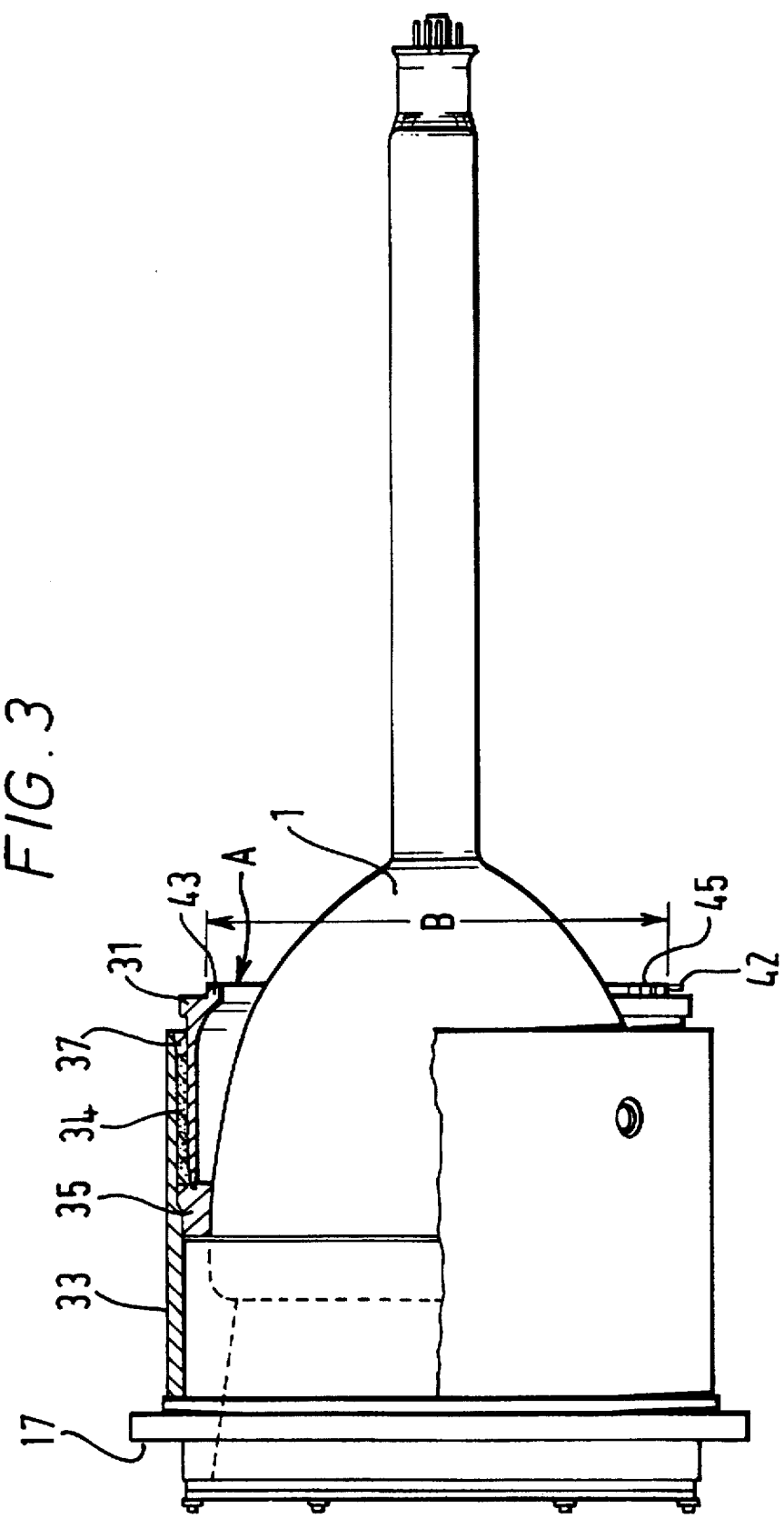

CATHODE RAY TUBE PACKAGES

This invention relates to cathode ray tube packages.

Cathode ray tubes with their fragile glass envelopes and high voltage connections are difficult to handle. In order to mitigate this problem, it is known to provide cathode ray tube packages including the glass envelope, a deflection coil and if necessary a focus coil in a mechanical housing, the housing being provided with the necessary high voltage connections in the form of flying lead electrical connections.

Cathode ray tube packages have been used widely in applications including Head Up Displays, Head Down Displays, Military Vehicle Displays and telecines. The packages are generally encapsulated with, for example, silicone rubber or epoxy and are throw away assemblies. One example of a known cathode ray tube package is shown in FIGS. 1 and 2 in which:

FIG. 1 is a schematic side view of the known cathode ray tube package; and

FIG. 2 is a schematic partly sectioned side view of the cathode ray tube package of FIG. 1.

Figure 4:
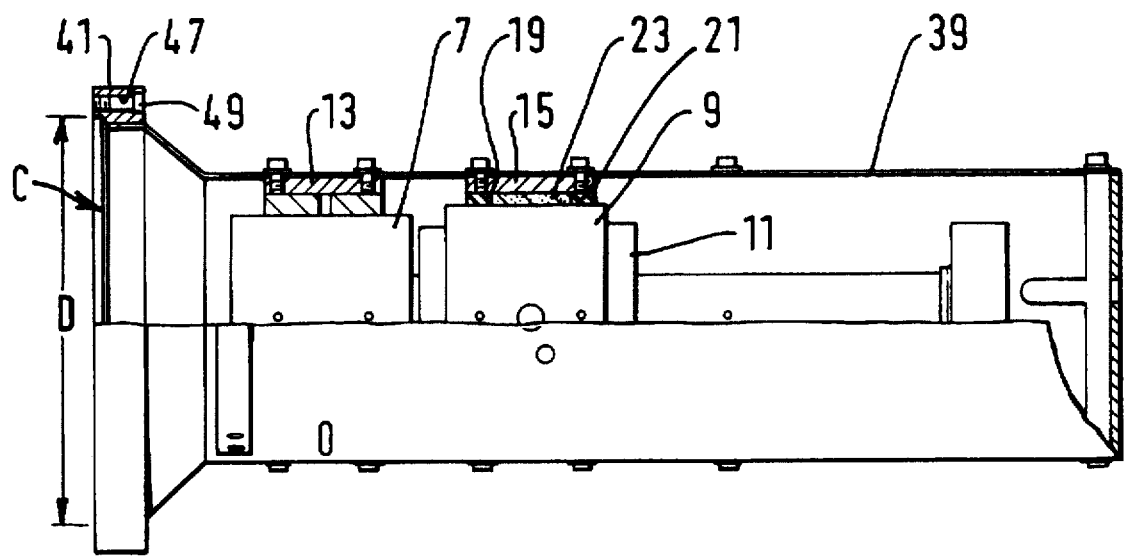

Referring to FIGS. 1 and 2, the known cathode ray tube package incorporates a cathode ray tube 1 formed with a glass envelope in the usual manner. The cathode ray tube 1 is mounted in a mechanical housing 3 provided with flying lead electrical connections 5, the housing 3 providing protection for the glass envelope of the cathode ray tube 1, and also shielding the cathode ray tube 1 from external magnetic fields. Round the cathode ray tube 1 are provided a deflection coil 7, a focus coil 9 and an astigmatism correction coil 11, the coils 7 and 9 being attached to the inside of the housing 3 by respective mounting tubes 13,15. The front of the housing 3 is provided with a mounting flange 17 to enable the package comprising the cathode ray tube 1, the housing 3 and the coils 7,9,11 to be mounted in the customer's equipment and accurately positioned with respect to the optical system (not shown).

It will be seen that the focus coil 9 must be aligned with the electron beam of the particular cathode ray tube 1 installed in the package in order to optimise the resolution of the cathode ray tube. This alignment procedure is carried out by mounting the focus coil 9 in an external gimbal unit (not shown) enabling the position of the focus coil 9 to be shifted in two mutually perpendicular directions at right angles to the tube axis, and tilted about these two axes. The spot caused by the impact of the electron beam on the phosphor screen of the cathode ray tube with the deflection current switched off, but with either fullwave a.c. current, or d.c. plus a.c. current, passing through the focus coil 9, is then observed by means of a microscope, and the position of the focus coil 9 adjusted by means of the gimbal unit. After alignment of the focus coil 9 has been achieved, the cavity defined between the focus coil 9, the focus coil mounting tube 15 and a pair of seals 19,21 is filled with a gap filling bonding material, for example, a resin 23. When the resin 23 has cured thus fixing the focus coil 9 in position, the external gimbal unit is removed. It will be appreciated that this process of alignment is a relatively lengthy procedure, and must be carried out by skilled personnel.

Because of manufacturing tolerances in cathode ray tube envelopes and/or electron guns, the alignment of the electron optical axis will also vary from tube to tube. Such variations mean that assembly of a replacement tube 1 in the housing 3 by a non-specialist, or specialist without specialist equipment, would lead to poor alignment of the focus coil 9 with respect to the electron beam axis, thus resulting in low resolution of the display on the screen of the cathode ray tube.

In view of the alignment procedure which must therefore be carried out, it is therefore not possible to replace the cathode ray tube in the package at the end of the cathode ray tube's life. Thus, if the cathode ray tube becomes non-functional, the whole package needs to be replaced.

It is an object of the present invention to provide a cathode ray tube package wherein the cathode ray tube may be more readily replaced within the package whilst maintaining the very rapid and relatively unskilled installation advantage of known cathode ray tube packages.

According to the present invention, there is provided a cathode ray tube package including a cathode ray tube assembly and a housing assembly, the package including an interface means effective to allow the cathode ray tube assembly and the housing assembly to be fitted together with the electron axis of the cathode ray tube assembly aligned with an electron beam adjustment means carried by the housing assembly.

Thus, according to the present invention in another aspect there is provided a cathode ray tube package including a first part and a second part, and means for enabling the first part and the second part to be fitted together in a predetermined manner.

Figure 5:
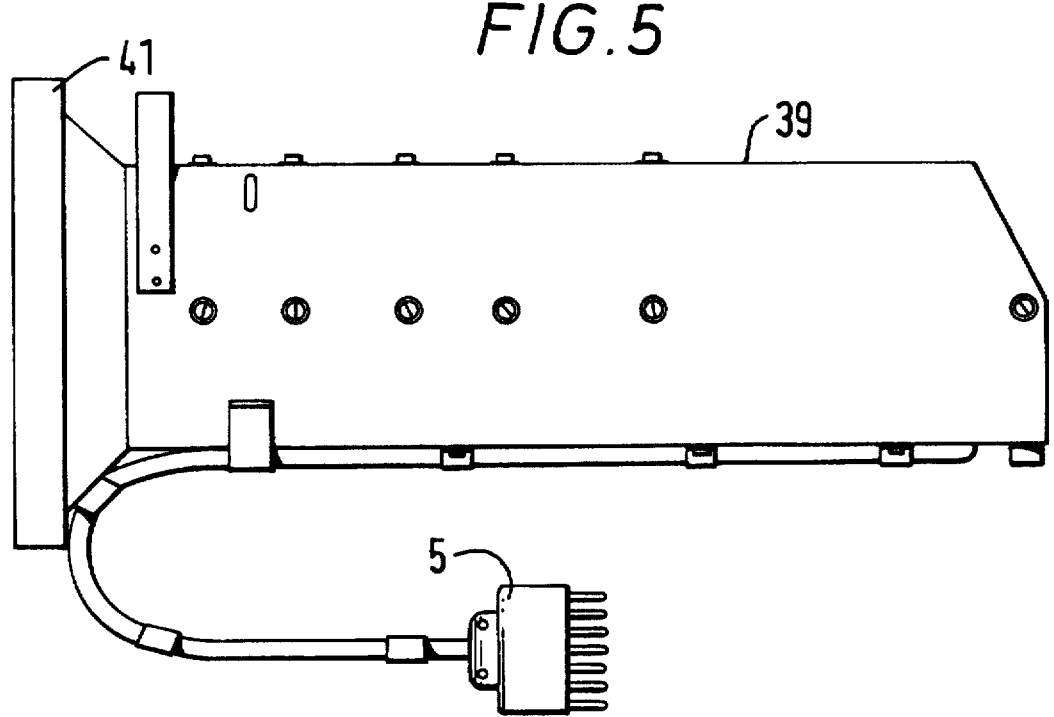
Figure 6:
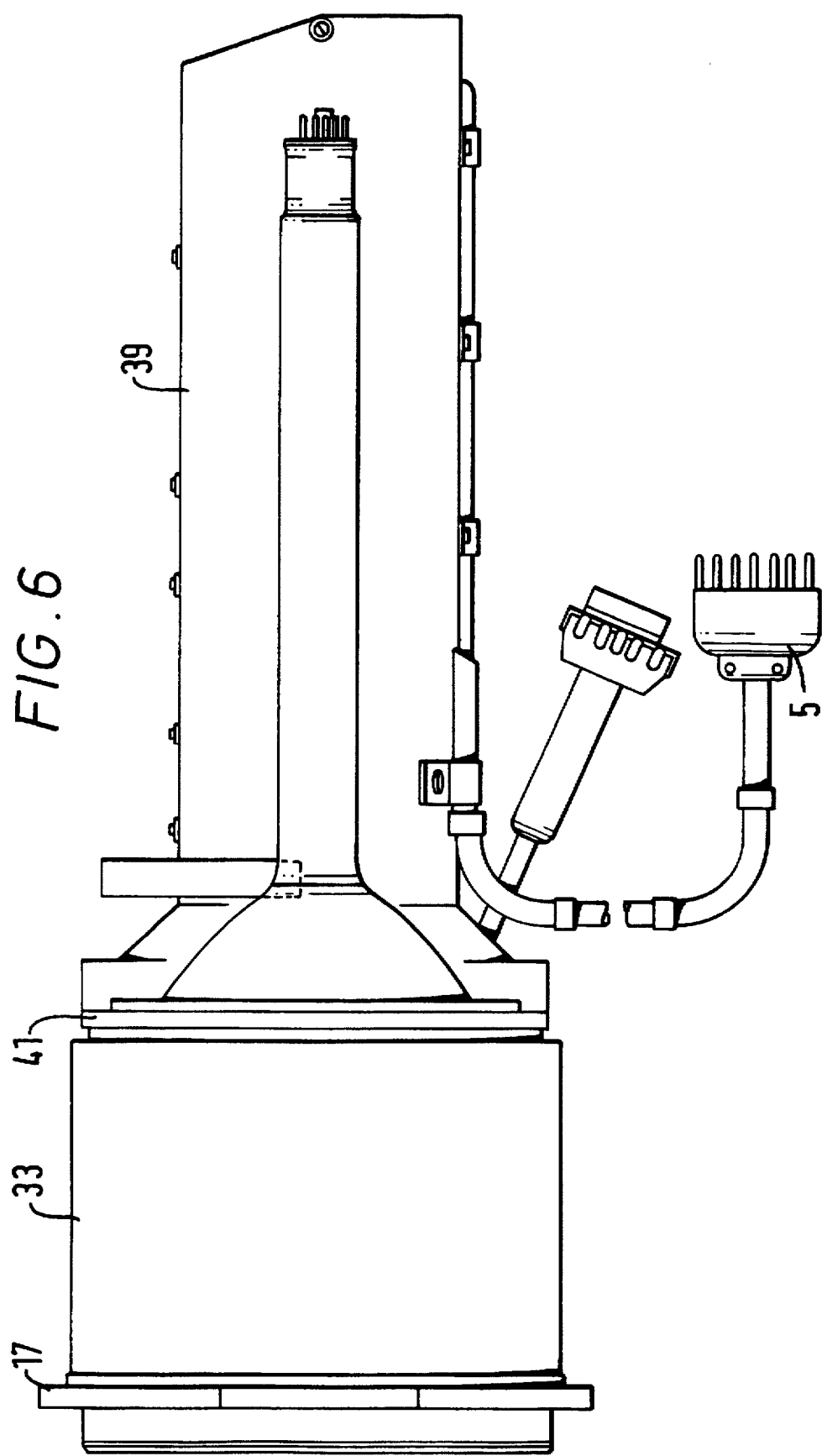

One embodiment of a cathode ray tube package in accordance with the invention will now be described, by way of example only, with reference to the accompanying figures, in which:

FIGS. 1 and 2 are respectively a schematic side view and a schematic partly sectioned side view of a known cathode ray tube package as has already been described;

FIG. 3 is a schematic partly sectioned side view of a cathode ray tube assembly for use in a cathode ray tube package in accordance with the invention;

FIG. 4 is a schematic side view of a housing assembly for a cathode ray tube package in accordance with an embodiment of the invention, this Figure being on a different scale to that of FIGS. 3 and 6;

FIG. 5 is a partly sectioned view of the housing assembly of FIG. 4; and

FIG. 6 is a schematic illustration of the cathode ray tube assembly of FIG. 3 fitted to the housing assembly of FIGS. 4 and 5.

In the cathode ray tube package to be described, features corresponding to those features shown in FIGS. 1 and 2 are correspondingly labelled.

The cathode ray tube package in accordance with an embodiment of the invention comprises two separate parts, a cathode ray tube assembly as illustrated in FIG. 3, and a housing assembly as illustrated in FIGS. 4 and 5.

Referring firstly to FIG. 3, the cathode-ray tube assembly includes a cathode ray tube 1 of the same basic form as the tube illustrated in the prior art package of FIGS. 1 and 2. The cathode ray tube assembly in accordance with the invention, however, differs from the prior art arrangement in that the cathode ray tube 1 is fitted with a collar 31. This collar 31 is aligned with the electron optical axis of the cathode ray tube 1 in a manner which will be described hereafter.

The collar 31 is bonded within an outer collar 33 with a gap filling bonding material, for example resin bonding material 34, constrained within two annular seals 35,37. This outer collar 33 forms part of the housing for the cathode ray tube 1 as will be seen later. The outer collar 33 is attached to the mounting flange 17 provided as in the prior art package to enable the package to be mounted on the rest of the optical system (not shown).

Turning now also to FIGS. 4 and 5, the second part of the cathode ray tube package comprises a housing assembly including a housing 39 in which are mounted a deflection coil 7, a focus coil 9 and an astigmatism correction coil 11 in similar manner to the prior art package.

The housing 39 carries a mounting collar 41 which, in use, is arranged to encircle a flange 43 carried on the internal collar 31 on the cathode ray tube assembly, the mounting collar 41 thus defining a datum surface A with a datum diameter B, which interfaces with the datum surface C having a datum diameter D of the collar 31. The mounting collar 41 is provided with a number of radially spaced holes 47 which are arranged to receive respective bolts 49 which, when the cathode ray tube assembly and housing assembly are clamped together pass into threaded holes 45 in the collar 31. The collar 41, together with the housing 39 is aligned in a fixed orientation relative to the cathode ray tube assembly by means of a dowel pin 42 located on the collar 31 which engages a slot 44 formed in the mating surface of the mounting collar 41. If the pin 42 does not locate in the slot 44, the mating surfaces of the collars 31 and 41 will not close together. Thus, the housing assembly and cathode ray tube assembly may be connected together as shown in FIG. 6 at a predetermined orientation to each other, with the outer collar 33 forming part of the housing for the cathode ray tube 1.

Prealignment of the cathode ray tube assembly and housing assembly is performed by a specialist prior to the supply of the assemblies to an end user. This prealignment will now be described.

The prealignment procedure comprises the following steps:

1. establishing a "master" cathode ray tube assembly;
2. using the "master" cathode ray tube assembly to establish a "master" housing assembly together with further production housing assemblies; and
3. using the "master" housing assemblies to align further cathode ray tube assemblies.

The "master" cathode ray tube assembly incorporates a selected cathode ray tube having its electron beam concentric with the neck of the cathode ray tube within a very small tolerance. The selected cathode ray tube is provided with an inner collar 31 which is located in a position concentric with the neck of the cathode ray tube and at a fixed axial distance from the tube reference line using a mechanical alignment jig.

The establishment of the "master" housing assembly takes place as follows:

The collar 31 on the "master" cathode ray tube assembly is initially fitted on to the mating mounting collar 41 of the housing assembly which is to form the "master" housing assembly, with the flange 43 of the collar 31 fitting inside the mounting collar 41. The alignment of the focus coil 9 with the electron axis of the "master" cathode ray tube assembly is carried out in a corresponding manner to the alignment of the focus coil in the prior art package described with reference to FIGS. 1 and 2. The position of the aligned focus coil 9 is then fixed by means of the curing of the resin 23 as before. All further housing assemblies are made in a similar manner.

In order then to align replacement cathode ray tube assemblies to the "master" housing assembly, the "master" housing assembly is removed from the "master" cathode ray tube assembly and the following procedure is then carried out:

1. The inner collar 31 of the cathode ray tube assembly is fitted with the correct orientation, as determined by the dowel pin 42 and slot 44, to the mounting ring of the master housing assembly 41 using the bolts 49.

2. The "master" housing assembly is mounted into a gimbal unit (not shown).

3. The cathode ray tube assembly (which is to have an inner collar 31 fitted) is inserted into a "master" housing assembly. The inner collar 31 should now be positioned inside outer collar 33.

4. After adjusting the Z position of the cathode ray tube (i.e. to ensure correct deflection coil position relative to the glass tube of the cathode ray tube), the mounting flange 17 is secured to a fixed plate mounting (not shown).

5. With the appropriate electrical supplies being connected to the CRT and coils, the "master" housing assembly is then shifted and tilted in order that the focus coil 9 is aligned with the electron beam. Following this, the housing assembly may need to be rotated several degrees in order that one of the magnetic axes of the deflection coil 7 may be correctly aligned with the mechanical reference axis of the cathode ray tube mounting flange 17.

6. On completing alignment, the cavity between the inner 31 and outer 33 collars is filled with the resin 34.

7. After the resin 34 has cured, the bolts 49 holding the mounting ring 41 to the inner collar 31 are removed from the "master" housing assembly 39. The cathode ray tube assembly is now ready to be supplied to an end user.

The thus aligned cathode ray tube assembly may now be fitted by an end user in any housing assembly supplied to the end user in which the focus coil 9 of the housing assembly has previously been aligned on the "master" cathode ray tube assembly. This enables new cathode ray tube assemblies to be fitted by the end user on such aligned housing assemblies as shown in FIG. 6 without the need for the complex alignment procedure necessary in the prior art packages to be carried out by the end user. It will be seen that in such a combination of a new cathode ray tube assembly and a housing assembly which has previously been aligned on the "master" cathode ray tube assembly, the electron axis of the cathode ray tube 1 will be aligned with the magnetic axis of the focus coil 9 carried by the housing assembly. Thus replacement of the cathode ray assembly by a non-specialist is enabled, the "pre-aligned" cathode ray tube assembly and housing assembly being supplied to the end user by a specialist supplier. This thus reduces replacement costs since the housing assembly incorporating the coil assemblies may be reused.

It will be appreciated that whilst the embodiment of the cathode ray tube package in accordance with the invention described herebefore by way of example describes a package in which the position of the collar 31 is aligned so as to align the focus coil 9 with the electron beam, alignment of the deflection coil 7 with the collar 31 may be achieved in a similar manner, with means equivalent to the resin 23 being provided to enable such alignment. This enables good line straightness and/or symmetry of deflection to be achieved when using a replacement cathode ray tube assembly in a housing assembly.

It will also be appreciated that whilst in the embodiment of the cathode ray tube package in accordance with the invention described hereinbefore by way of example, both the focussing and deflection of the beam is achieved by means of coils 7,9, the invention is also applicable to cathode ray tube packages in which the focussing or deflection is achieved electrostatically.

We claim:

1. A process for producing a cathode ray tube assembly comprising a cathode ray tube and an interface member for enabling the cathode ray tube to be positioned in a housing assembly carrying a prealigned electron beam adjustment means, said cathode ray tube assembly including two collars, a surface of one of the collars defining the interface member, and the other collar being fixed in position relative to the cathode ray tube, said process comprising the steps of:

mounting the interface member in a position fixed relative to a reference electron beam adjustment means;

supporting the cathode ray tube in a position such that the reference electron beam adjustment means controls the electron beam;

effecting relative movement between the cathode ray tube and the reference electron beam adjustment means, thereby also effecting relative movement between the cathode ray tube and the interface member and causing the position of said one collar to be adjusted relative to the other collar, until the reference electron beam adjustment means controls the electron beam of the cathode ray tube in a required manner;

securing the interface member to the cathode ray tube to form the cathode ray tube assembly by securing said one collar to the other collar; and removing the cathode ray tube assembly from the reference electron beam adjustment means.

2. A process according to claim 1 in which the step of securing said one collar to the other collar is performed by filling a gap between the two collars with a bonding material.

3. A process according to either claim 1 or claim 2, in which the other collar forms a housing for part of the cathode ray tube.

4. A process for producing a housing assembly for a cathode ray tube package, the housing assembly including at least one prealigned electron beam adjustment means, the housing assembly carrying an interface member for enabling the housing assembly to be positioned relative to a cathode ray tube assembly having a mating interface member, comprising the steps of:

attaching the housing assembly interface member to a mating interface member carried by a reference cathode ray tube assembly having a predetermined electron beam axis, the mating interface having a fixed position relative to the electron beam axis and the electron beam adjustment means being supported in a position so as to control the electron beam of the cathode ray tube;

adjusting the electron beam adjustment means to cause the electron beam of the cathode ray tube to be controlled in a required manner;

securing the position of the electron beam adjustment means within the housing assembly so as to have a fixed position relative to the housing assembly interface member; and removing the electron beam adjustment means from the reference cathode ray tube assembly.

5. A process according to claim 4, in which the prealigned electron beam adjustment means comprises at least one focusing means.

6. A process according to claim 4 or claim 5 in which the prealigned electron beam adjustment means comprises at least one deflection means.

7. A cathode ray tube assembly for use in a cathode ray tube package, the package comprising the cathode ray tube assembly and a housing assembly including at least one prealigned electron adjustment means, the cathode ray tube assembly comprising:

a cathode ray tube;

first alignment means for aligning the cathode ray tube with an optical system external to the cathode ray tube assembly;

a second alignment means for aligning the cathode ray tube with the housing assembly, the second alignment means comprising a first interface member for mating with a second interface member carried by the housing assembly, the first interface member being secured in position in the assembly by securing means which permits adjustment of the position of the first interface member relative to the first alignment means during manufacture of the assembly for defining the position of the cathode ray tube relative to the electron beam adjustment means of the housing assembly when the cathode ray tube assembly is connected thereto.

8. A cathode ray tube assembly according to claim 7, wherein the securing means is a bonding material which is set during the manufacture of the assembly.

9. A cathode ray tube housing assembly for use in a cathode ray tube package, the package comprising the housing assembly and a cathode ray tube assembly carrying an interface member having a fixed position relative to the electron beam axis of the cathode ray tube, the housing assembly comprising at least one prealigned electron beam adjustment means for the cathode ray tube assembly; and a housing assembly interface member aligned with the prealigned electron beam adjustment means so as to enable the housing assembly to be fitted to the cathode ray tube assembly in a predetermined manner with the electron beam of the cathode ray tube being controlled by the prealigned electron beam adjustment means in a required manner, said prealigned electron beam adjustment means being in adjustably secured in a fixed position relative to the interface member.

10. A cathode ray tube package comprising:

a cathode ray tube assembly including a cathode ray tube and a first alignment means for aligning the cathode ray tube with an optical system external to the cathode ray tube assembly;

a housing assembly including at least one prealigned electron beam adjustment means; and a further alignment means for aligning the cathode ray tube with the housing assembly, the further alignment means comprising:

an interface member carried by the cathode ray tube assembly in a fixed position relative to the electron beam axis; and an interface member carried by the housing assembly in a fixed position relative to the prealigned electron beam adjustment means;

the two interface members being arranged to mate together to enable the cathode ray tube assembly to be fitted to the housing assembly in a predetermined manner with the electron beam being controlled by the prealigned electron beam adjustment means in a required manner.

11. A cathode ray tube package comprising:

a cathode ray tube assembly;

a housing assembly including at least one prealigned electron beam adjustment means;

an interface member carried by the cathode ray tube assembly in a fixed position relative to the electron beam axis; and an interface member carried by the housing assembly in a fixed position relative to the prealigned electron beam adjustment means;

the two interface members being arranged to mate together to enable the cathode ray tube assembly to be fitted to the housing assembly in a predetermined manner with the electron beam being controlled by the prealigned electron beam adjustment means in a required manner, said prealigned electron beam alignment means being inadjustably secured in a fixed position relative to the interface member carried by the housing assembly.

12. A cathode ray tube package according to claim 11, further comprising:

an alignment means for enabling the cathode ray tube package to be aligned with an optical axis external to the package.

13. An assembly according to claim 7, in which the at least one prealigned electron beam adjustment means comprises a focusing means.

14. An assembly according to claim 7, in which the at least one prealigned electron beam adjustment means comprises a deflection means.

15. A package according to claim 10, in which the at least one prealigned electron beam adjustment means comprises a focusing means.

16. A package according to claim 10, in which the at least one prealigned electron beam adjustment means comprises a deflection means.

17. A cathode ray tube assembly comprising:

a cathode ray tube;

first alignment means for aligning the cathode ray tube with an optical system external to the cathode ray tube assembly; and a second alignment means for aligning the cathode ray tube with a prealigned coil system within an external apparatus;

wherein said second alignment means comprises a first interface member for mating with a second interface member carried by the external apparatus, the first interface member being secured in position in the assembly by securing means which permits adjustment of the position of the first interface member relative to the first alignment means during manufacture of the assembly.

* * * * *

UNITED STATES PATENT AND TRADEMARK OFFICE
CERTIFICATE OF CORRECTION

PATENT NO. : 5,793,448
DATED : August 11, 1998
INVENTOR(S) : Atkinson et al.

It is certified that error appears in the above-identified patent and that said Letters Patent is hereby corrected as shown below:

Column 6, line 37, "in adjustably" should read --inadjustably--.

Signed and Sealed this

Twenty-ninth Day of December, 1998

Attest:

BRUCE LEHMAN

Attesting Officer

Commissioner of Patents and Trademarks